United States Patent
Warner et al.

(10) Patent No.: US 12,481,611 B2
(45) Date of Patent: *Nov. 25, 2025

(54) SYSTEM, METHODOLOGY, AND PROCESS FOR WIRELESS TRANSMISSION OF SENSOR DATA ONBOARD AN AIRCRAFT TO A PORTABLE ELECTRONIC DEVICE

(71) Applicant: North Flight Data Systems, LLC, Shreveport, LA (US)

(72) Inventors: Jeffery N. Warner, Arlington, TX (US); George Donald Rucker, II, Shreveport, LA (US)

(73) Assignee: North Flight Data Systems, LLC, Shreveport, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/947,700

(22) Filed: Sep. 19, 2022

(65) Prior Publication Data

US 2023/0229611 A1    Jul. 20, 2023

Related U.S. Application Data

(63) Continuation of application No. 16/277,371, filed on Feb. 15, 2019, now Pat. No. 11,500,805, which is a
(Continued)

(51) Int. Cl.
*G06F 13/38* (2006.01)
*B64D 43/00* (2006.01)
(Continued)

(52) U.S. Cl.
CPC ........... *G06F 13/385* (2013.01); *B64D 43/00* (2013.01); *G06F 1/266* (2013.01); *G06F 13/10* (2013.01);
(Continued)

(58) Field of Classification Search
None
See application file for complete search history.

(56) References Cited

U.S. PATENT DOCUMENTS

| 6,262,994 B1 * | 7/2001 | Dirschedl | H04L 47/36 370/465 |
| 6,397,128 B1 * | 5/2002 | Todd | B64D 45/00 340/964 |

(Continued)

*Primary Examiner* — Elias Mamo
(74) *Attorney, Agent, or Firm* — Garvey, Smith & Nehrbass, Patent Attorneys, L.L.C.; Julie Rabalais Chauvin; Vanessa M. D'Souza (57) ABSTRACT

Monitoring and reporting methods and apparatus include the acquisition of detailed aircraft state and systems data, analysis of the collected data, and transmission of the collected data and/or analysis of the collected data to a destination automatically via a portable electronic device which is carried onto and off of the aircraft by the pilot or another crew member. More particularly, monitoring and reporting methods and apparatus include collecting analog or digital sensor data onboard an aircraft, analyzing the data in real-time, and automatically transmitting the data and/or analysis of the data to a destination including a portable storage device such as a portable computer, electronic flight bag (EFB), or smart phone, by means such as wireless transmission, for automatic transfer to another destination when the portable computer, electronic flight bag (EFB), or smart phone is off of the aircraft.

20 Claims, 10 Drawing Sheets

Related U.S. Application Data continuation of application No. 15/386,301, filed on Dec. 21, 2016, now Pat. No. 10,255,214, which is a continuation of application No. 14/340,276, filed on Jul. 24, 2014, now Pat. No. 9,563,580.

(60) Provisional application No. 61/858,444, filed on Jul. 25, 2013.

(51) Int. Cl.
*G06F 1/26* (2006.01)
*G06F 13/10* (2006.01)
*G06F 13/20* (2006.01)
*G06F 13/42* (2006.01)
*G07C 5/00* (2006.01)
*G07C 5/08* (2006.01)
*H04L 67/125* (2022.01)
*H04L 67/568* (2022.01)

(52) U.S. Cl.
CPC .......... *G06F 13/20* (2013.01); *G06F 13/4282* (2013.01); *G07C 5/008* (2013.01); *G07C 5/0858* (2013.01); *H04L 67/125* (2013.01); *H04L 67/568* (2022.05)

(56) References Cited

U.S. PATENT DOCUMENTS

| | | | | |
|---|---|---|---|---|
| 6,789,016 | B2 * | 9/2004 | Bayh | G01S 13/933 |
| | | | | 701/14 |
| 8,666,748 | B2 * | 3/2014 | Dong | B64D 45/00 |
| | | | | 704/270.1 |
| 9,193,449 | B2 * | 11/2015 | Cox | B64C 25/405 |
| 9,208,687 | B2 * | 12/2015 | Wang | G08G 5/0008 |
| 2005/0149238 | A1 * | 7/2005 | Stefani | B64F 5/60 |
| | | | | 701/33.4 |
| 2007/0081672 | A1 * | 4/2007 | Li | H04W 12/069 |
| | | | | 380/270 |
| 2013/0158991 | A1 * | 6/2013 | Dong | B64D 45/0051 |
| | | | | 704/235 |

* cited by examiner

SYSTEM, METHODOLOGY, AND PROCESS FOR WIRELESS TRANSMISSION OF SENSOR DATA ONBOARD AN AIRCRAFT TO A PORTABLE ELECTRONIC DEVICE

CROSS-REFERENCE TO RELATED APPLICATIONS

This is a continuation of U.S. patent application Ser. No. 16/277,371, filed 15 Feb. 2019 (issued as U.S. Pat. No. 11,500,805 on 15 Nov. 2022), which is a continuation of U.S. patent application Ser. No. 15/386,301, filed 21 Dec. 2016 (issued as U.S. Pat. No. 10,255,214 on 9 Apr. 2019), which is a continuation of U.S. patent application Ser. No. 14/340,276, filed 24 Jul. 2014 (issued as U.S. Pat. No. 9,563,580 on 7 Feb. 2017), which claims the benefit of U.S. Provisional Patent Application No. 61/858,444, filed 25 Jul. 2013, hereby incorporated herein by reference, and priority of which is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to methods and apparatus that include the acquisition of data, analysis of the collected data, and transmission of the collected data and/or analysis of the collected data to a destination by means known to a practitioner of ordinary skill in the art. More particularly, the present invention relates to methods and apparatuses that include collecting analog or digital sensor data onboard an aircraft, analyzing said data in real-time, and transmitting the data and/or analysis of the data to a destination including a portable storage device such as a portable computer or electronic flight bag (EFB) by means including wireless transmission. The application of this invention includes sensor data gathered from aircraft used in field of avionics such as aircraft or other data collection/generating devices such as medical apparatus, IR (infra-red)heat sensing sensors, or other devices whereas the invention is used to pre-process or post-process the collected information.

2. General Background of the Invention

In the normal operation of aircraft, pilots are typically required to carry flight bags that contain reference material such as aircraft operating manuals, flight-crew operating manuals, and navigational charts. In order to promote efficiency in flight management tasks and reduce the usage of paper, electronic information management devices such as EFBs have been employed by flight crews. Such EFBs allow for use of various applications including static applications such as document viewers, flight crew operating manuals, electronic approach charts, and multifunctional displays for systems such as navigational systems and air traffic control instructions. Furthermore, EFBs can include various means of data transmission including memory stick transfer and wireless connectivity.

Also, aircraft in general have onboard systems which communicate in real-time with systems on the ground during the course of a flight. Methods and apparatus directed towards such systems have patented. For example, U.S. Pat. No. 7,835,734 to Eckert et al. discloses an avionics system including a wireless router located on an aircraft and configured to transceive wireless signals; and a processing unit located in the aircraft and configured to supply the wireless router with configuration parameters after determining it is time to connect to a ground network, the configuration parameters based on the location of the aircraft; wherein the wireless router uses the configuration parameters to establish a wireless connection with the ground network and route data from at least one client application on the aircraft to at least one ground application server.

In view of the current state of art, current technologies related to electronic flight bags and real-time communications systems have yet to address the need for systems and apparatus that can efficiently collect, analyze, and transmit data recorded by an aircraft's sensors or other such sensors carried aboard or affixed to the aircraft. Such systems could aid commercial aircraft carriers in improving efficiency in delivery of their services to customers as applied to concerns or issues that include flight costs or flight crew performance. Also, such systems could provide vital data to administrative agencies regulating the field of avionics for various investigatory concerns such as efficiently determining the cause of an aircraft failure.

The following references are incorporated herein by reference:

U.S. Pat. Nos. 6,115,656; 6,181,990; 6,477,152; 6,788,935; 7,103,456; 7,149,612; 7,437,220; 7,456,756; 7,612,688; 7,769,501; 7,835,734; 7,908,042; 8,121,593; 8,244,4128, 258,983; 8,316,225; 8,335,601; 8,433,475; and 8768534.

U.S. Patent Publication Nos.: 2005/0149238; 2013/0124018; 2003/0003872; 2005/0026609; 2010/0152924; 2010/0075614; 2012/0191273; 2006/0080451; and 2008/0039076; 2012/0143405; 2013/0124018; 2013/0274964.

PCT Publication Nos.: WO 2002/079918 and WO 2011/017812.

Chinese patent document CN 201408360.

Publication: Teledyne Controls Brochure: Electronic Flight Bags.

Simon Plass, Future Aeronautical Communications, InTech (2011), available at http://www.nmxmuhammad.com/papers/Future_Aeronautical_Communications.pdf.

Kim et al., A Rapid QAR Data Acquisition and Visualization System for Aircraft Engine Maintenances. Proceedings of iiWAS2009 (2009).

BRIEF SUMMARY OF THE INVENTION

The disclosed invention addresses what the current state of the art has yet to address.

The present invention relates to methods and apparatus that include the automatic acquisition of data, analysis of the collected data, and preferably automatic wireless transmission of the collected data and/or analysis of the collected data to a destination for storage or analysis, for example, from an aircraft by automatically transmitting the data to a portable device on the aircraft which is carried onto the aircraft by the pilot or other crew member and is removed by the pilot or other crew member when he exits the aircraft. More particularly, the present invention relates to methods and apparatus that include automatically collecting analog or digital sensor data onboard an aircraft, analyzing said data in real-time, and automatically transmitting the data and/or analysis of the data to a destination including a portable storage device such as a portable computer or electronic flight bag (EFB) by means including wireless transmission.

It is sometimes best to encrypt data first, then automatically transmit to a device that will leave with the pilot. Preferably the data is automatically wirelessly transmitted to a portable storage device in the airplane, but one could use cat-5 cable or other wire to connect to a computer or computer-like device.

Preferably one uses a powered device that can capture the data (a device with logic platform versus a simple storage device, such as an SD card), whether the data comes wirelessly or through a wire, and the device enters the aircraft with the pilot and leaves with the pilot.

The present invention includes automatically moving a consolidated stream of data to a device that contains logic (preferably a computer), preferably in real time or near real time.

Preferably, the computer has software that analyzes the data and can send messages to remote locations or simply let those in the aircraft know that there is an issue (the computer can be programmed to detect some issues that normal flight equipment might not).

Two recent events have occurred in FAA rules to make the present invention possible:

(1) wifi can now be on aircraft:
(2) electronic flight bags are now allowed in the cockpit.

The hardware used in the collection, processing and transmission over wifi to the EFB or other portable electronic device can reside in the MFDAU (preferably), QAR, or any such external device that is integrated into the system.

Preferably, the data is automatically wirelessly transmitted to the EFB or other portable electronic device carried by the pilot or other crew member onto the aircraft, then automatically wirelessly downloaded from the EFB or other portable electronic device after the EFB or other portable electronic device is removed from the aircraft by the pilot or other crew member, typically when the portable electronic device connects to a network after it is removed from the aircraft. While the data could be downloaded via for example a Cat5 cable after the portable electronic device leaves the aircraft, wireless transmission is preferred.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
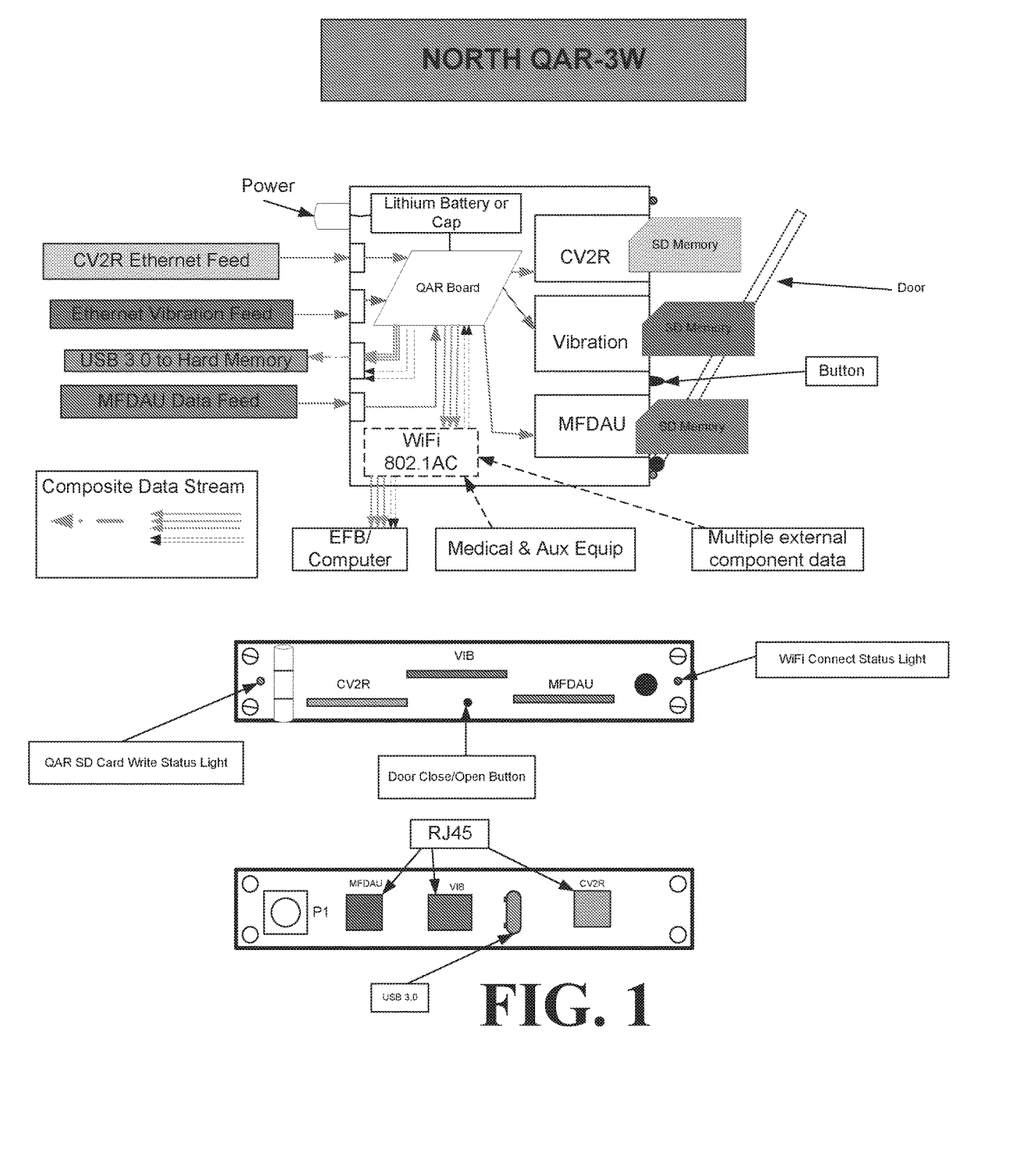
FIG. 1 is a perspective view displaying a preferred embodiment of the present invention.

FIG. 1 is a perspective view displaying an embodiment of the apparatus of the present invention. A preferred embodiment of the present invention includes an apparatus comprising a lithium battery, capacitor, or other power source; inputs for a Cockpit Voice Recorder (CV2R) Ethernet Feed, an Ethernet Vibration Feed, a Multi Function Data Acquisition Unit (MFDAU) Data Feed: a Universal Serial Bus (USB) 3.0 Adapter to Hard Memory; a Quick Access Recorder (QAR) Board; at least one slot for receiving a storage medium to record data collected from a Cockpit Voice Recorder (CV2R) Ethernet Feed, an Ethernet Vibration Feed, a Multi Function Data Acquisition Unit (MFDAU) Data Feed; and means of transmission including wireless transmission. The apparatus further comprises a means for receiving power from an outside power source and a door providing access to the slot. The wireless transmission is preferably accomplished through a Wifi router with the IEEE 802.1 lac standard. The inputs are preferably connected by an RJ45 ethernet connection to a MFDAU. The storage medium is preferably a Secure Digital (SD) memory card. The means of transmission can be transferring multiple external component data to other storage means such as an EFB, a computer, medical, or auxiliary equipment. In a preferred embodiment, the QAR preferably receives data from the CV2R Ethernet Feed, the Ethernet Vibration Feed, and the MFDAU Data Feed. In a more preferred embodiment, the MFDAU preferably both sends and receives data to and from the CV2R Ethernet Feed, the Ethernet Vibration Feed, Airinc 429, and auxiliary inputs such as analog signaling devices The MFDAU feed preferably includes airframe, engine, and component data via a direct interface to digital ARINC (including but not limited to ARINC 717 and 429 data), serial (including but not limited to RS232, RS485) and analog data streams as well as aircraft state data as provided by internal or external gyros and accelerometers. The collected data preferably provides detailed aircraft state, including pitch, roll, G forces, vertical speeds, detailed engine operating parameters (i.e., turbine speeds, oil pressure & temperatures) and primary aircraft system parameters (rotor speeds, transmission and gearbox oil pressures and temperatures). Also preferably included in the data stream delivered to the MFDAU or QAR is the state of caution and warning lights and the position/state of significant system switches in the aircraft (i.e., landing gear switch and gear position indicator lights). Detailed GPS component data streams are preferably included in the acquired data. Once received, the MFDAU or QAR board preferably directs a composite data stream to the EFB and/or through the USB 3.0 Adapter to hard memory. The composite data stream is preferably transmitted from the MFDAU or QAR to the EFB wirelessly. This preferred embodiment preferably also includes light indicators for the MFDAU QAR SD Card Write Status and WiFi connection status as well as a button for opening and closing a door. A preferred apparatus is a NORTH QAR-3 W Quick Access Recorder or MFDAU with a means for wireless transmission of data, both of which can be similar to NORTH QAR-3 W Quick Access Recorder or MFDAU currently commercially available from North Flight Data Systems, LLC.

A MFDAU is a multi-function data acquisition unit. It typically includes at least the following: Digital and analog data receivers, an internal attitude and heading reference system, and other such electronic devices with which to acquire information from various devices. When used in the present invention, it preferably also includes a logic platform and operating system that facilitates the acquisition of data, hosts firmware and software to enable it to either direct the raw data or to manage acquired data and to perform analyses of the data, manipulate the data, encrypt the data, and classify the data as to type, origin, and protocol for processing the data.

A QAR is a quick access recorder which includes an SD card slot, an SD card in the slot, a cable to reach a data source, such as the MFDAU. It is akin to a SD card reader for a computer. When used to transmit data in the present invention, it preferably also includes a wireless data router, wireless access point, solid state memory, and logic.

Figure 2:
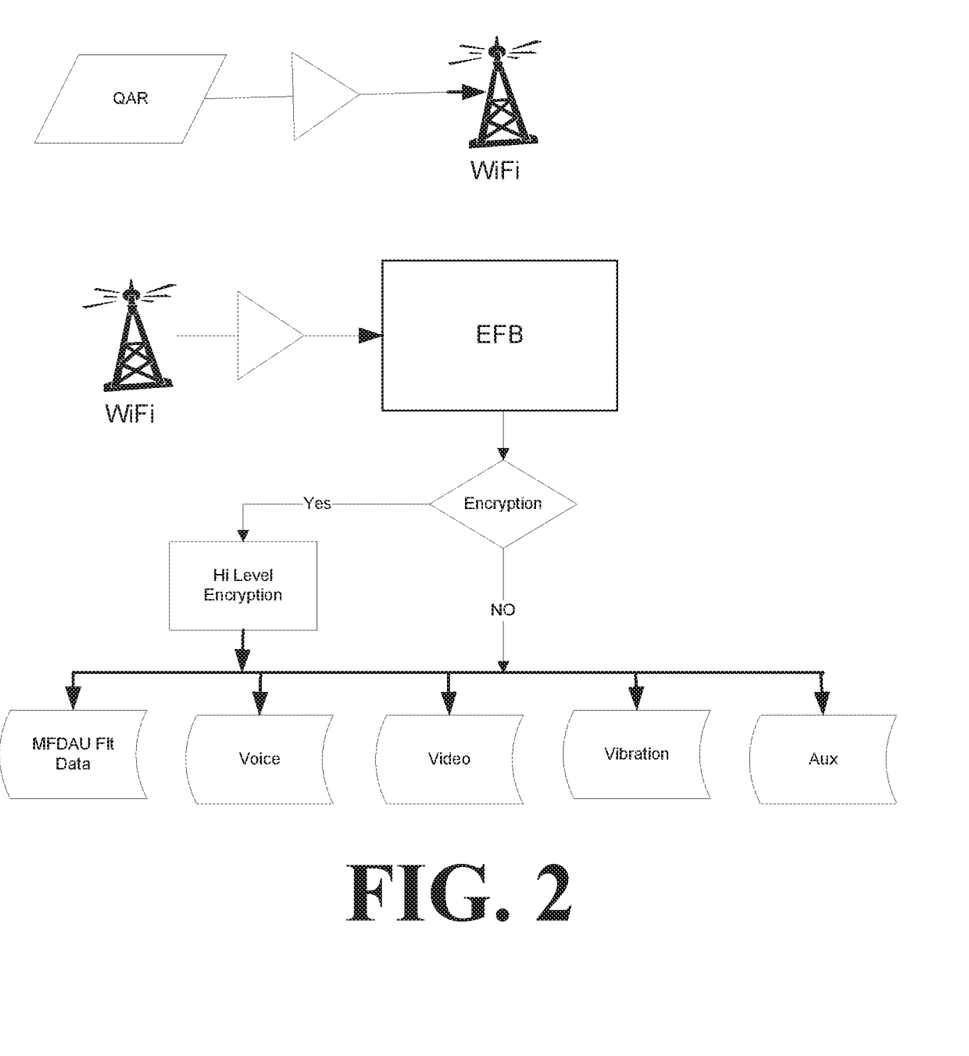
FIG. 2 is a schematic view of a QAR transfer of data through a wireless network to an EFB.

FIG. 2 is a schematic view of the QAR transfer of data through a wireless network to an EFB. In a preferred embodiment, the QAR transmits data wirelessly to the EFB. In this transfer of data, an option is given as to whether the data should be encrypted. If the encryption is option is selected, the data is encrypted at a high level. The MFDAU of the present invention with wireless capability could be used in place of the QAR in FIG. 2.

Figure 3:
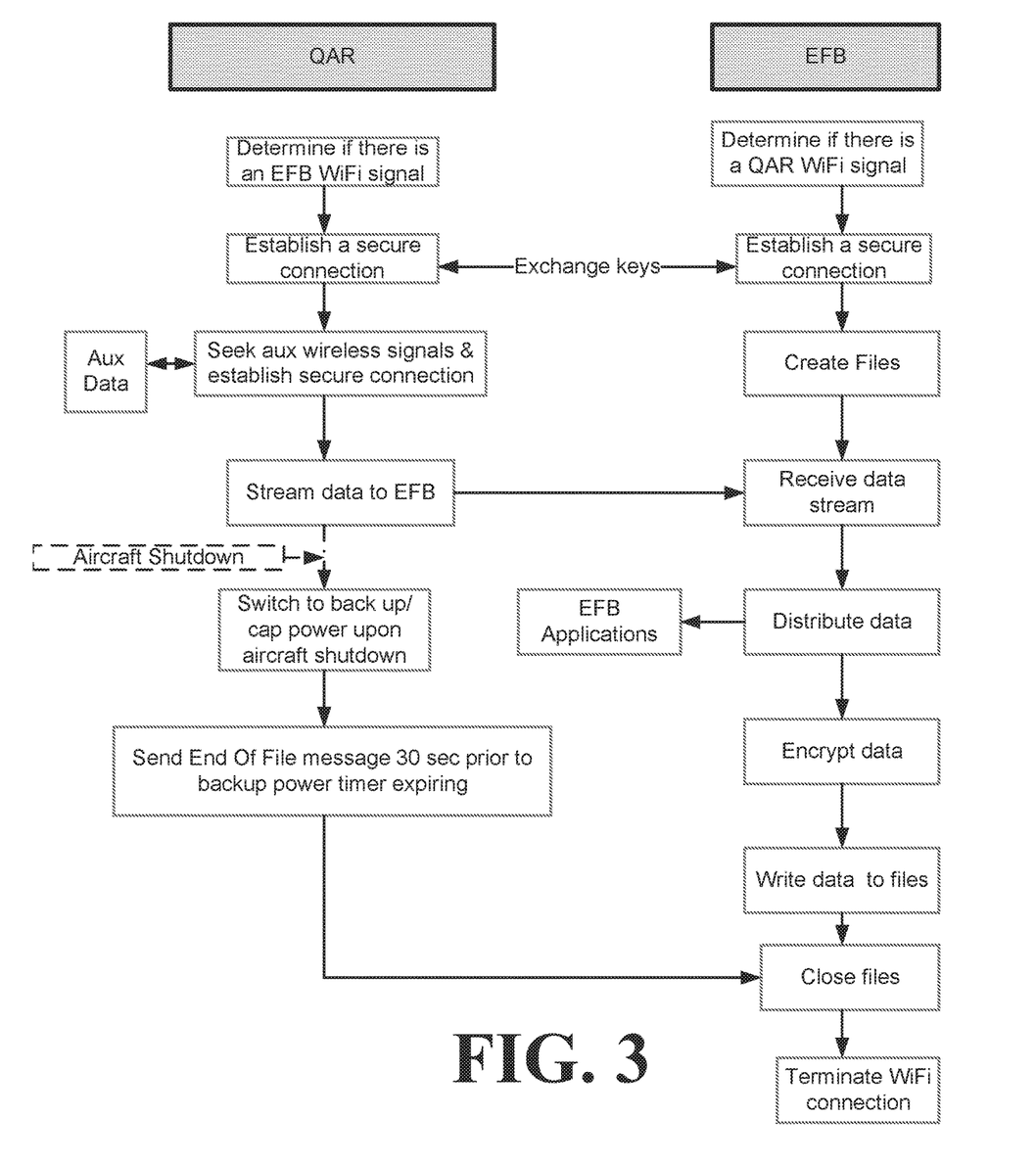
FIG. 3 is a schematic view of a process for transferring data from the QAR to the EFB.

FIG. 3 is a schematic view of the process for transferring data from the QAR to the EFB. In the preferred embodiment, the QAR board attempts to and establishes a secure connection with the EFB wirelessly. The QAR may also seek auxiliary wireless signals to establish a secure connection. In preparation for receiving data, the EFB may create files to incorporate the transmitted data within. Once a secure connection has been established, the QAR streams the data to the EFB. When the aircraft has shut down, the QAR may switch to a backup/cap power and may send an end-of-file message prior to a backup power timer expiring. Once the data is received from the QAR, the EFB may include means of distributing the data, encrypting the data, or writing the data to the previously created files. Once the data is written to files, the EFB may close the files and terminate the wireless connection with the QAR. In FIG. 3, one could substitute a MFDAU of the present invention with wireless capability for the QAR.

Figure 4:
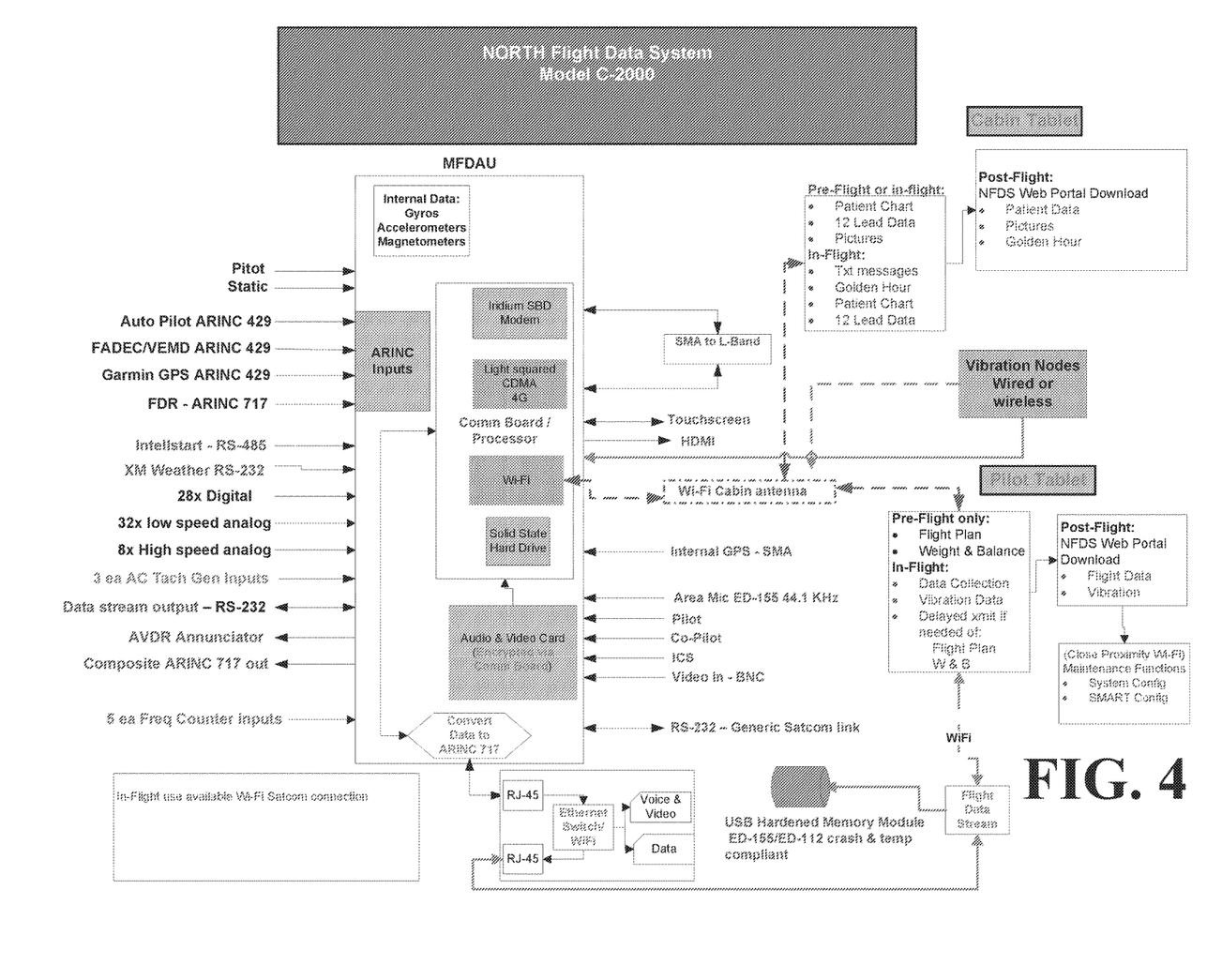
FIG. 4 is a schematic of high level use for a preferred embodiment of the apparatus of the present invention.
Figure 5:
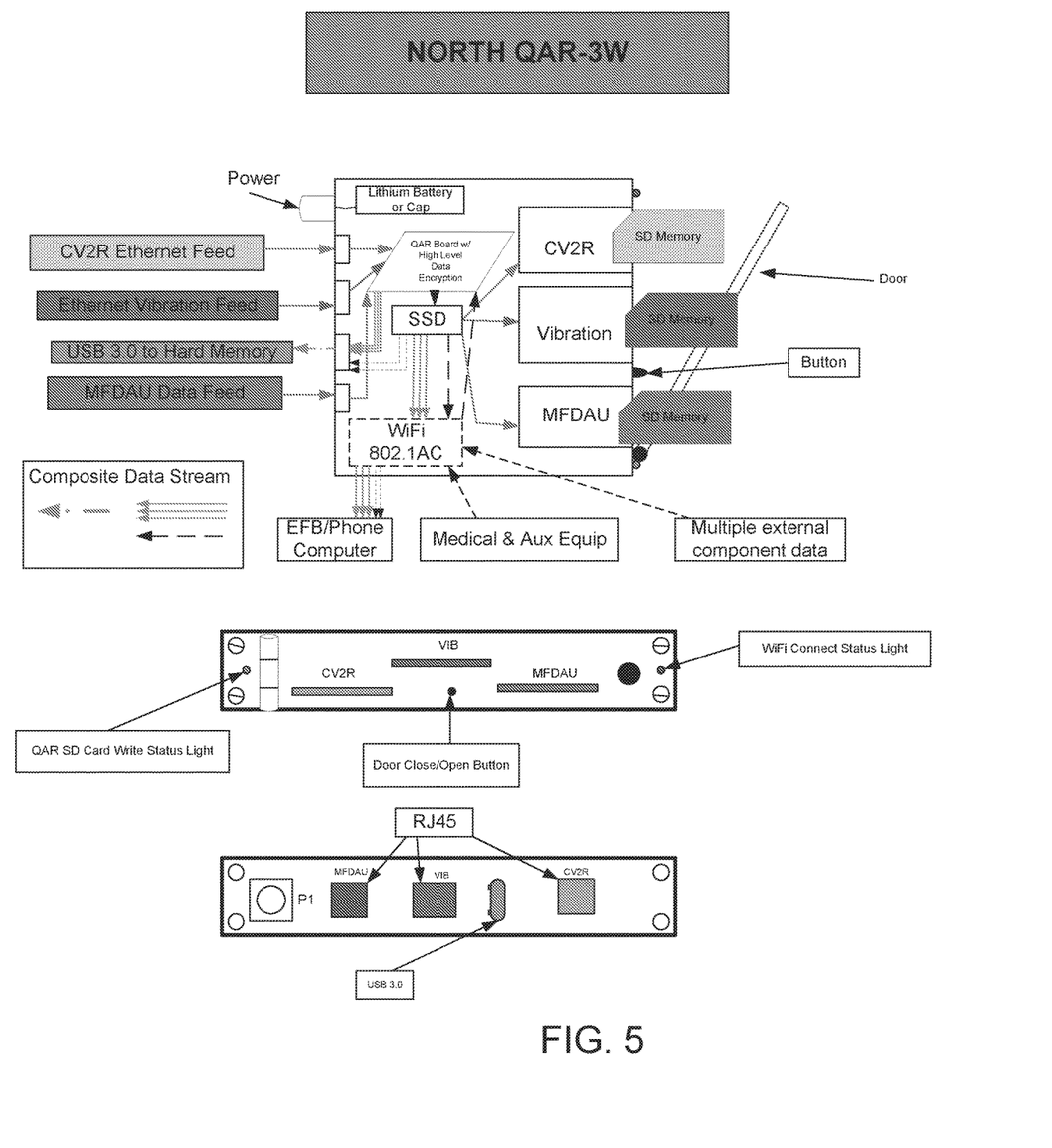
FIG. 5 is a perspective view displaying a preferred embodiment of the present invention which differs from that shown in FIG. 1 primarily in that the QAR Board includes high level data encryption.
Figure 6:
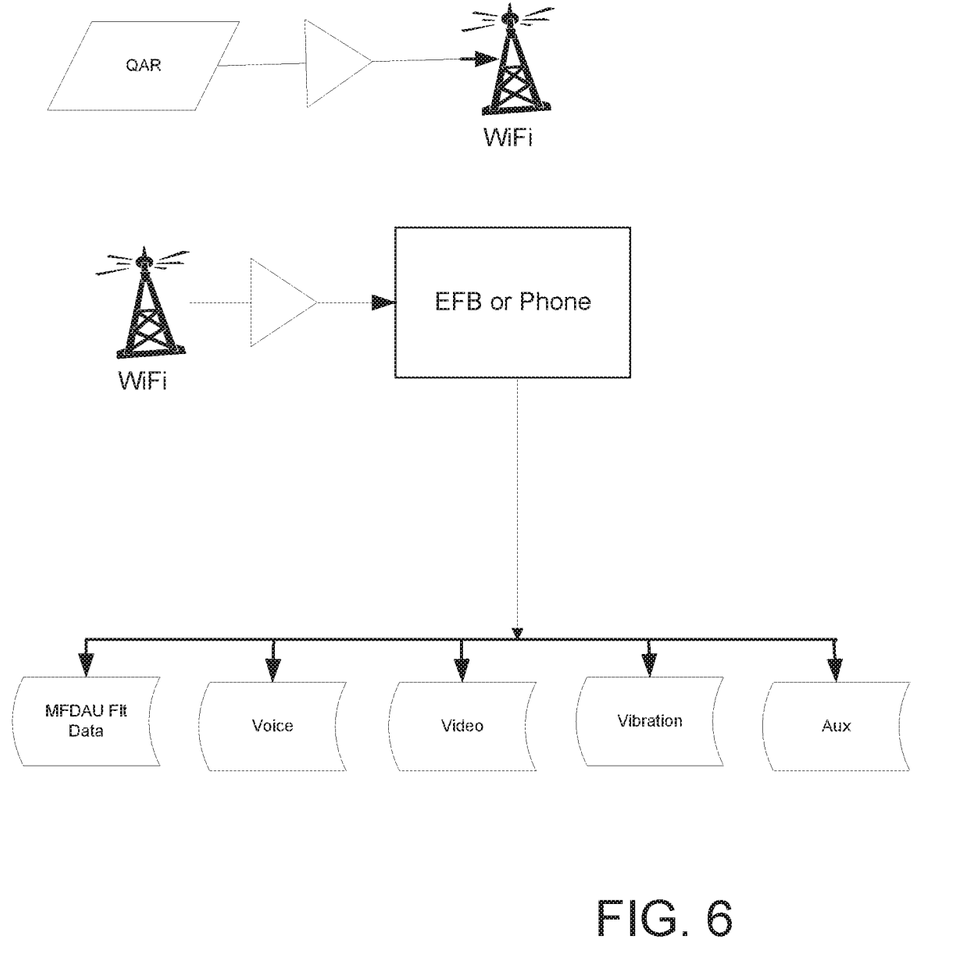
FIG. 6 is a schematic view of a QAR transfer of data through a wireless network to an EFB, and differs from FIG. 2 primarily in that the data can be transmitted through an EFB or a telephone and is already encrypted by the QAR before being transmitted.
Figure 7:
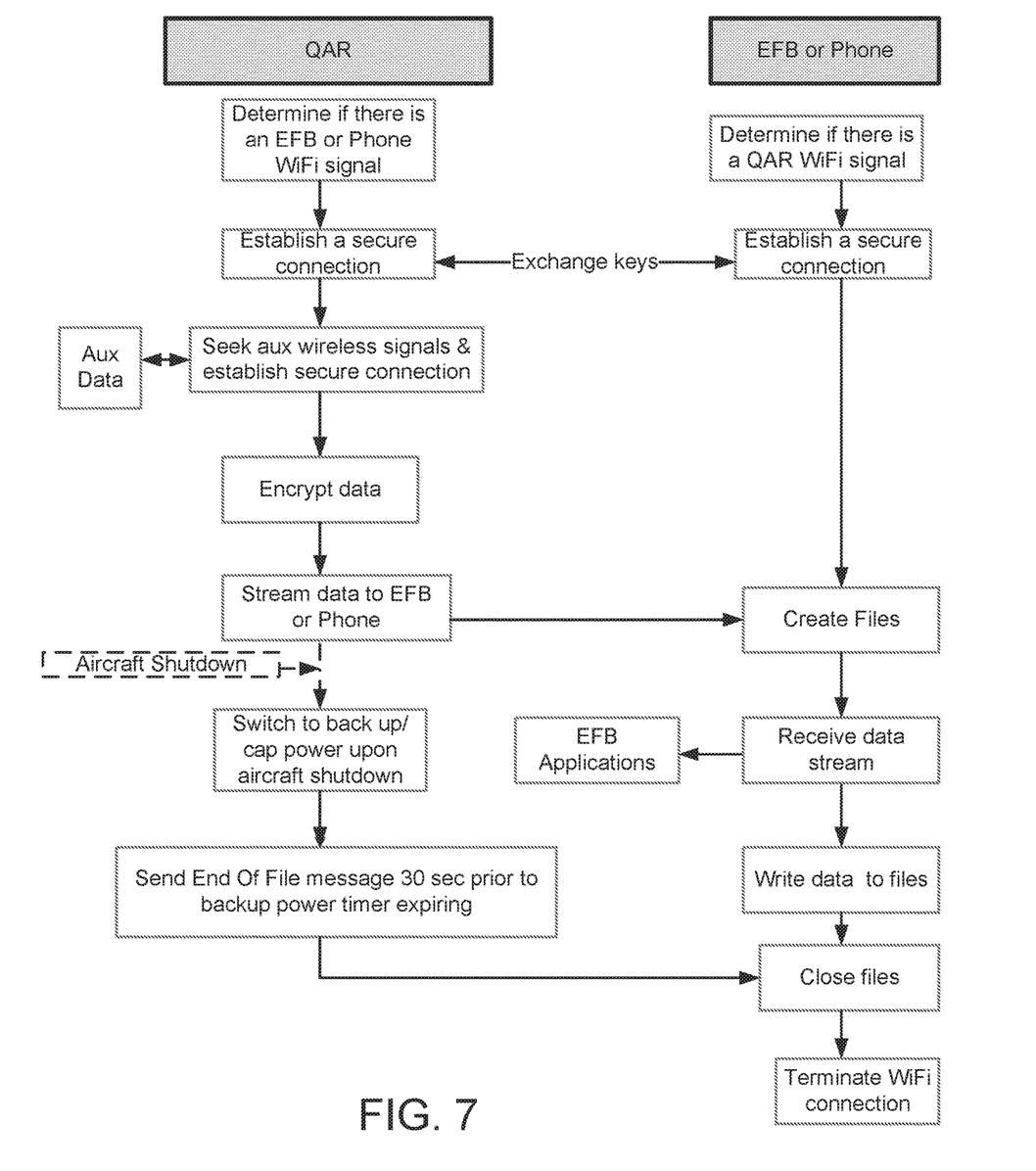
FIG. 7 is a schematic view of a process for transferring data from the QAR to the EFB or telephone, and differs from FIG. 3 primarily in that the data can be transmitted through an EFB or a telephone and is already encrypted by the QAR before being transmitted.
Figure 8:
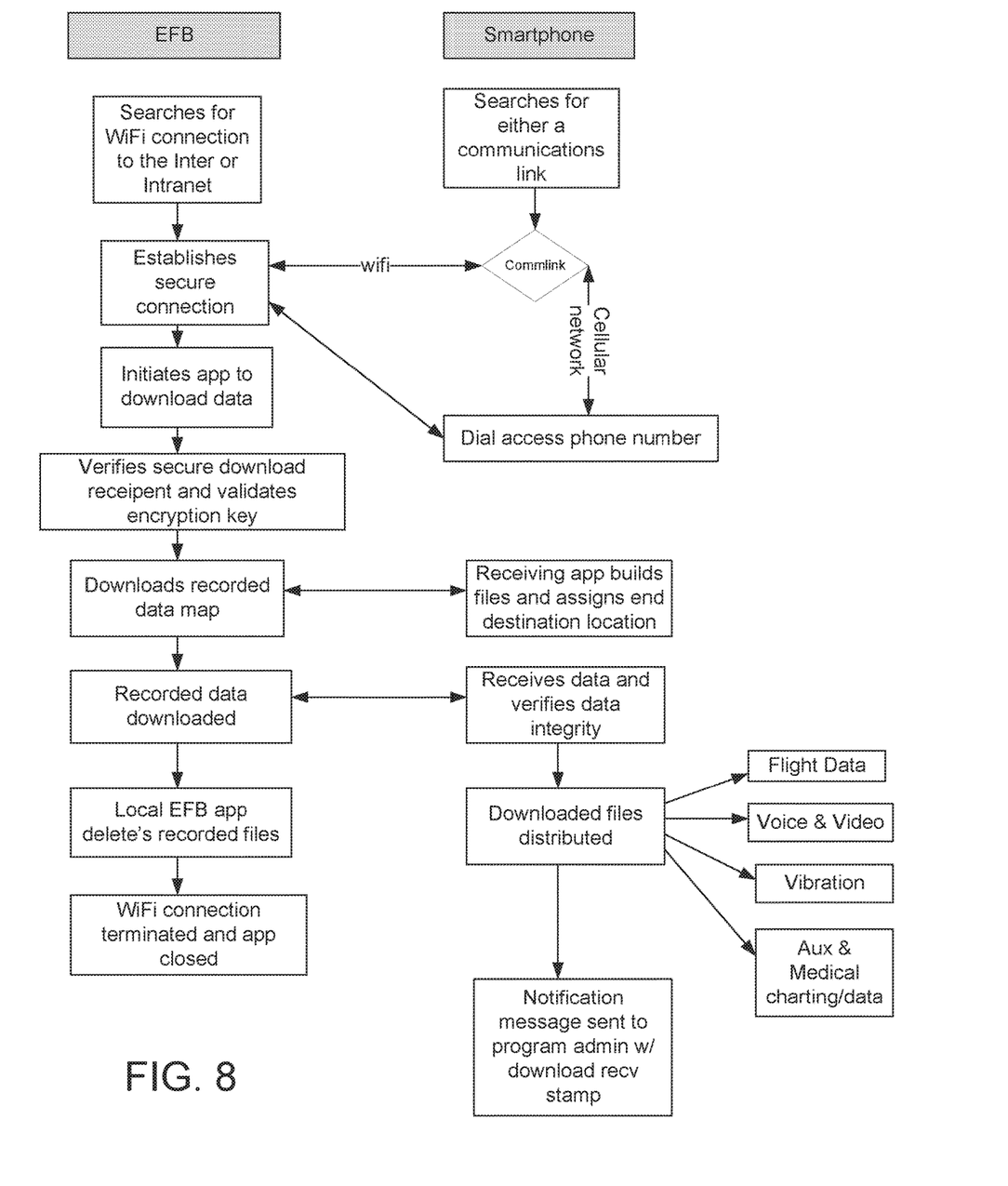
FIG. 8 is a flow chart showing how data is downloaded via wifi after the EFB is removed from an aircraft for a preferred embodiment of the apparatus of the present invention.
Figure 9:
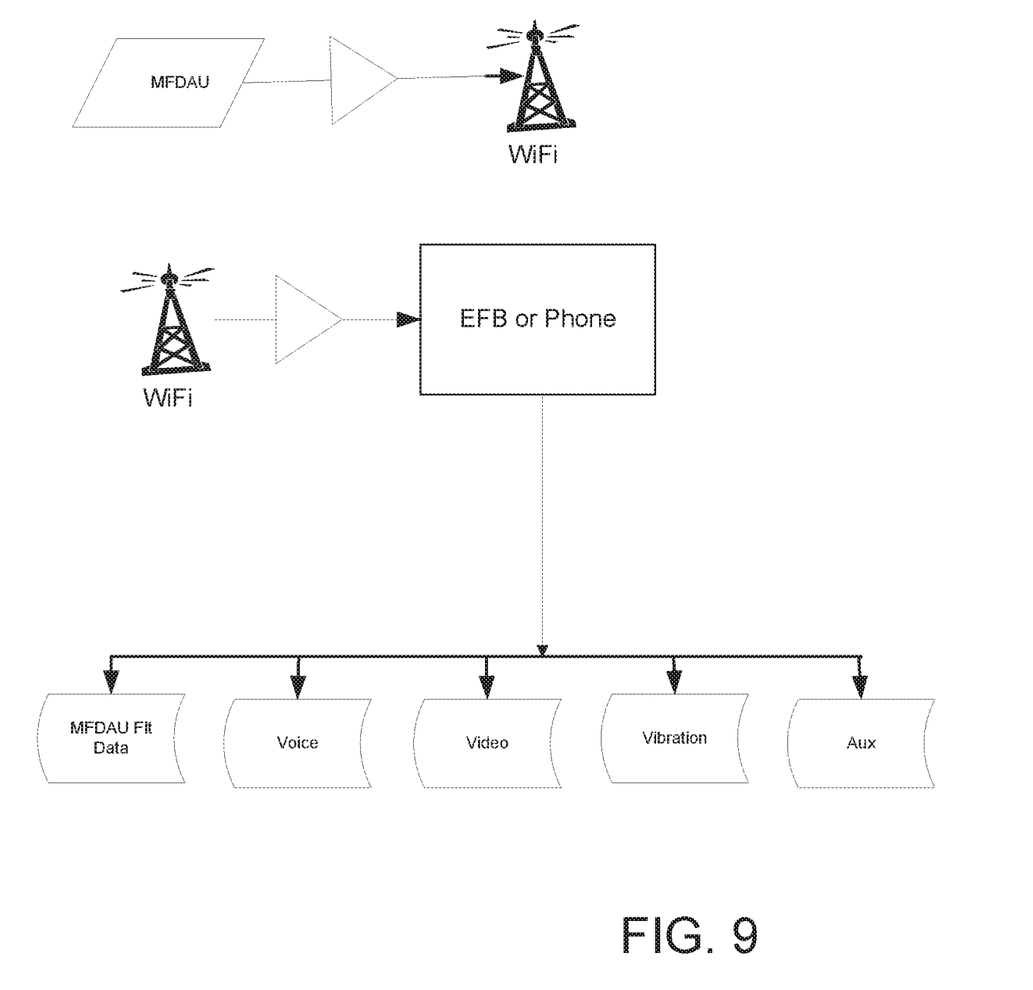
FIG. 9 is a schematic view of a MFDAU transfer of data through a wireless network to an EFB, and differs from FIG. 6 primarily in that the data can be transmitted through a MFDAU instead of a QAR.
Figure 10:
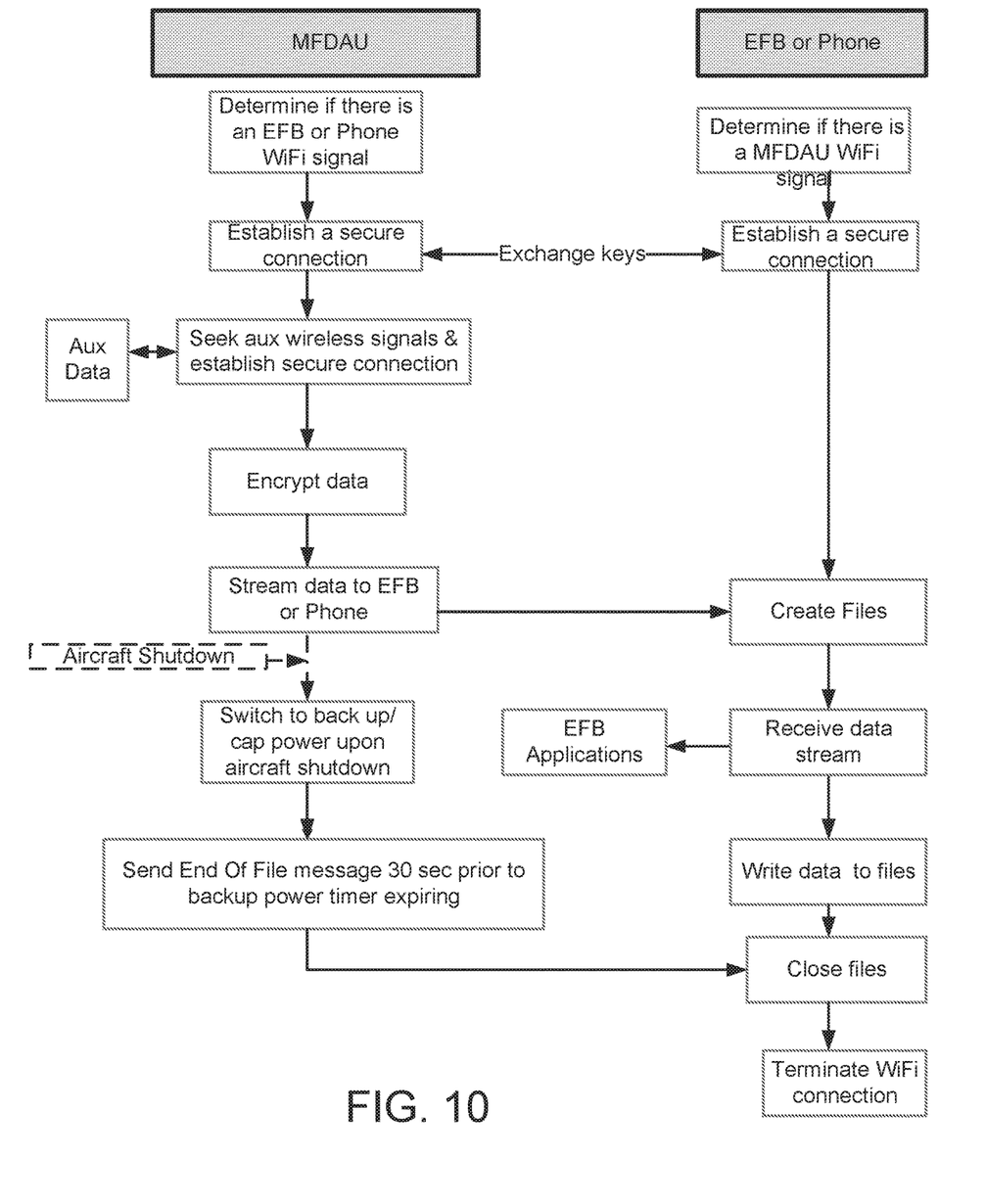
FIG. 10 is a schematic view of a process for transferring data from the MFDAU to the EFB or telephone, and differs from FIG. 7 primarily in that the data can be transmitted through the MFDAU instead of the QAR.

FIG. 4 is a schematic of high level use for a preferred embodiment of the application of the present invention. A preferred embodiment of the present invention includes a system comprising a Cabin Tablet, a Pilot Tablet, vibration nodes, and a MFDAU. The system further comprises a WiFi Cabin antenna, a USB Hardened Memory Module, and an Ethernet switch. The system may be used pre-flight, during flight, or post flight. The cabin tablet is preferably connected to MFDAU, Pilot Tablet, and Vibration Nodes via the WiFi Cabin antenna. The Cabin tablet preferably has access to patient charts, 12 Lead Data, and Pictures in the pre-flight stage. The Cabin tablet preferably has access to text messages, patient charts, data such as generated by Golden Hour software, and 12 lead data during the inflight stage. The Cabin tablet preferably has access to patient data, pictures, and data such as generated by Golden Hour software in the post flight stage. The data accessible to the cabin tablet is preferably accessed by a NFDS Web Portal Download. The Pilot tablet is preferably connected to MFDAU, Cabin tablet, and vibration nodes via the WiFi Cabin antenna. The Pilot tablet preferably has access to flight plan and weight & balance data in the pre-flight stage. The pilot tablet preferably has access to data collection data and vibration data during the inflight stage. During both the pre-flight and in flight stages, the pilot tablet may preferably access a flight data stream. A mechanic or other individual may access the historical and live data stream during the flight to perform maintenance or other sensor input viewing and/or analysis. The pilot tablet preferably has access to data collection data and vibration data in the post flight stage. The data accessible to the pilot tablet is preferably accessed by a NFDS Web Portal Download. The pilot tablet preferably includes maintenance functions such as SMART Config and System Config. These maintenance functions are preferably accessed when in close proximity to a WiFi connection. The WiFi Cabin antenna preferably makes use of SubMiniature version A (SMA) connectors. The USB Hardened Memory Module is preferably ED-155 and/or ED-112 crash and temperature compliant. The Ethernet switch preferably uses RJ-45 connectors to connect with the MFDAU and Pilot Tablet. The Ethernet switch also preferably inputs multiple external component data to data storage mediums such as secure digital memory cards. The MFDAU preferably includes a Comm Board/Processors, transport communications systems inputs, an audio and video card, and means of gathering internal data from sensors. The MFDAU may include a satellite connection such as a RS-232-Generic Satcom link. The Comm Board/Processors preferably include a modem, a code divisional multiple access (CDMA), a hard drive, and the means for wireless transmission. The modem is preferably an iridium short data burst modem. The CDMA is preferably a light squared CDMA 4G. The hard drive is preferably a solid state hard drive. The means of wireless transmission preferably includes use of the WiFi Cabin Antenna. The Comm Board/Processors preferably includes means of encrypting data from the audio and video card. The Comm Board/Processors also preferably includes means of converting acquired data into Aeronautical Radio, Incorporated (ARINC)717. The MFDAU preferably includes inputs for: receiving internal data from sensors such as gyros, accelerometers, and magnetometers; pilot data; Co-pilot data; static data; auto pilot ARINC 429; FADEC/VEMD ARINC 429; Garmin global position system (GPS) ARINC 429; FDR-ARINC 717; Intellstart-RS-485; XM Weather RS-232; AC Tach Gen Inputs; 28× Digital; 32× low speed analog; 8× high speed analog; Video In-BNC Connectors; Area Mic ED-155 44.1 kHz; ICS (internet connection sharing); and SMA to L-Band. The MFDAU preferably includes outputs for: an A, V, D, R Annunciator; Composite ARINC 717 out; and a USB hardened memory module. The MFDAU preferably includes outputs and inputs for a High-Definition Multimedia Interface connection, a touchscreen. RS-232 connection for a data stream output or a Generic Satcom Link; and Ethernet Switch.

The present invention includes methods and apparatus directed to collecting internal and external analog and digital sensor data; analyzing the sensor data; and transmitting of said data to a portable storage device.

In one embodiment of the present invention, the method or apparatus includes a process of collecting data. The data preferably includes internal and external data that may further include data acquired from an analog or digital sensor. Sensor data also includes aircraft, state, component data, voice, video, and vibration information. The data recording is preferably combined into a combined data stream. The combined data stream is preferably transferred to either a fixed or portable onboard storage device via wireless transmission. The combined data stream preferably includes data from similar and dissimilar devices (i.e. aircraft data; video and still camera images such as jpeg, mpeg formats; forward infra-red camera images, radioactive particle sensor data, medical device data).

In another embodiment of the present invention, the method or apparatus includes a process of analyzing data. Analysis of such data may include analysis of aircraft sensor data in a virtual live basis in flight with Flight Operational Quality Assurance (FOQA). The analysis may also include an analysis of aircraft sensor data with vibration software that preferably compares the composite data stream to either a predetermined set of events criteria or historical data trends providing Maintenance Operation Quality Assurance (MOQA) system or subsystem health.

In another embodiment of the present invention, the method or apparatus includes transmitting an alert with an exceedance message via a cellular or satellite data conduit after processing the sensor data analysis. This element differs from downloading raw aircraft data wirelessly in that the sensor data has been processed prior to transmission.

In another embodiment of the present invention, the method or apparatus includes transmitting the aircraft sensor data to a crash hardened device installed onboard the aircraft by wireless means.

In another embodiment of the present invention, the method includes combining hardware and software into an apparatus that can be carried, wherein the apparatus wirelessly collects, encrypts, provides for critical near real time processing, and packages data for off load to a corporate data infrastructure for long time processing and preservation. This embodiment of the invention may be further defined to include a process of removing a portable or quasi portable device that has acquired data from onboard wireless devices from an aircraft then acquiring a wired or wireless connection (to the internet or possibly a company's/entity's intranet) and sending that composite data via that wireless connection/conduit. A process of encrypting all collected data and delivering either encrypted or non-encrypted data is a preferable part of this process. The process of taking the composite data stream, breaking it up and sending it to either one or multiple locations or applications which may or may not act independently. (i.e., send aircraft data to FOQA app, medical data to hospital or doctor, video data to video or motion picture platform, thermal images to law enforcement entities, radioactive readings to an engineering firm). This process is meant to cover the acquisition of dissimilar data via onboard wireless and the administration and distribution of the data from a portable or quasi portable computer and/or electronic device which contains logic.

In another embodiment of the present invention, the method and apparatus includes an avionics data acquisition and recording system. Such system preferably provides an ability to collect wired and wireless sensor data and to deliver a composite data stream through a wireless router (such as 802.11n or 802.1AC) to a portable or quasi portable device that contains logic. The preferred system function would be to have one device mounted in the aircraft that collects: cockpit voice and video from a CV2R device, aircraft flight data (i.e., engine, airframe, and component generated data); aircraft vibration data via airframe mounted sensors or other vibration acquisition components, and external devices data via wi-fi connection (i.e., heart monitor). Once the data is collected by for example either a NORTH QAR-3 W Quick Access Recorder or MFDAU, it preferably distributes/writes each primary data stream to an appropriate SD card within the QAR or MFDAU and combines all data source information and transmits it to a portable computer (i.e., EFB, tablet, semi fixed computer device, possibly in a permanently mounted docking station) via a wi-fi transmission.

When the system initially boots up the QAR-3 W wifi or MDFAU wifi preferably looks for a receiving device. Each receiving device preferably has been programmed with the appropriate router address and WPA password. The NORTH software/app is preferably set to run when the device is powered up and when the EFB recognizes the QAR wifi or MFDAU wifi and opens a connection to write live stream of data to the EFB memory. When this link is established a "Blue" LED on the QAR or MDFAU preferably illuminates indicating a positive connection and the NORTH app preferably places a "Blue Light" on the tray at the bottom of the EFB screen to preferably indicate positive connection. The QAR (when it is the wifi transmitter—otherwise the MFDAU detects this connection) preferably sends a "message" to the MFDAU which in turn sends a message/flips a bit, which illuminates alight on the system A, V, D, R annunciator (and may turn the letter Blue) to indicate to the pilot that the system is connected and recording via wifi to the EFB.

As the composite data stream is received, the NORTH app preferably takes the data and applies 128 bit encryption as it writes the data to the computer's memory. The recorded data is preferably made available to other software programs the customer wishes to run. The NORTH app preferably monitors the data stream and connection. If the connection is lost, the NORTH app preferably tries to re-establish the connection. If the wifi connection remains intact but the data ceases to flow, the NORTH app preferably initiates the shutdown and closing of files.

While the live data feed is being received by the EFB, a customer can preferably run a live data analysis programs. This may include but not limited to FOQA analysis, and vibration data analysis.

When the aircraft is shut down and power is removed from the NORTH Flight Data System, the battery and/or capacitors preferably provide power to perform the following function: the CV2R will preferably continue to run and power the video camera for one (1) minute. It will preferably record/send data from all 6 channels of audio and one channel of video to: an internal CV2R compact flash memory; a QAR-3 W for writing to the QAR "CV2R" SD card; and QAR WiFi router or MFDAU wifi router for transmission to the EFB device. The MFDAU will preferably continue to send any available sensor data to the QAR-3 W for one (1) minute and continue to send power (POE) to the QAR for approximately 30 seconds after cessation of data feed to facilitate the closing of the "MFDAU" SD card data file. The QAR-3 W will preferably receive its primary power from the MFDAU via power of Ethernet (POE) and write any received data to the appropriate SD card and continue to transmit that composite data stream over the wifi router (unless the MFDAU has the wifi router) as long as it receives that MFDAU power. Upon cessation of the MFDAU POE the internal QAR-3 W battery or capacitor will preferably provide power for the closing of files on all SD cards and preferably send an electronic message to the EFB via wifi to close the files on the EFB (alternatively, the MFDAU sends this electronic message if it is making wifi contact with the EFB). When the EFB returns a message that the files have been closed properly, the QAR (or MFDAU) will preferably terminate the wifi connection and shutdown.

After the shutdown process is completed the NORTH EFB app will preferably provide a written message to EFB to confirm a successful shutdown or note an error has occurred. If the EFB loses power by either having ship's power removed from the "docking station" or other source, the NORTH app will preferably close the received data files under the EFB internal battery power. If the EFB or such device has sensed the internal battery may not have sufficient power to continue operation (i.e., low battery alert), the NORTH app will preferably initiate the proper closing of files on the EFB.

If there is a data feed interruption for more than 15 seconds sensed by the EFB (either by the lack of data or a break in the wifi connection), the NORTH app will preferably initiate the closing of previously received data files. If the wifi link is lost, the QAR-3w and/or the MFDAU and the EFB via the NORTH app will preferably try to re-establish the link for a period of one (1) minute. When the wifi link is lost, the blue LED light on the QAR will preferably turn red and the annunciator light will either turn off or turn amber in color.

EFB/Tablet Collection and Processing:

An embodiment of the invention includes placing the computing device or EFB in the aircraft and allowing the computing device or EFB to operate on its own battery power (physical security of the device to be determined by aircraft pilot/operator).

Another embodiment of the invention includes mounting the computing device or EFB in the aircraft via a docking station which has been permanently affixed to the airframe.

Another embodiment of the invention includes a display being an integral part of the computing device or EFB, which is considered "carry on equipment".

Another embodiment of the invention includes a display for the computing device or EFB that can be considered "Loose carry on equipment" to be secured at the discretion of the pilot/operator.

When an aircraft is initially powered up, the recorder (QAR and/or MFDAU) preferably goes through a system check and the WiFi router preferably broadcasts a Service Set Identifier (SSID) for an EFB receiving device to "see". If necessary the QAR preferably stores accumulated data from the MFDAU, CV2R and Vibration acquisition units and "buffers" that data until the WiFi router is activated and can make a positive connection with the EFB. Upon establishing a positive connection to the EFB, the QAR (or MFDAU) preferably transmits all stored/buffered data and initiates the continuous flow of received data. If for some reason (regulatory or otherwise) the WiFi router must be disabled (possibly during takeoff or approach/landing) the QAR and/or MFDAU will preferably store/buffer the collected data and upon reactivation of the WiFi router and/or connection the stored data will be sent to the EFB by the QAR or MFDAU.

When an EFB is identified by the QAR router or MFDAU router, the EFB and QAR router or MFDAU router preferably conduct a security check via a shared security key encryption. When a positive connection is made, a signal is preferably sent to the QAR to illuminate the "Blue" WiFi connection LED light on the QAR. Simultaneously, a signal will be preferably sent to the optional panel mounted Annunciator to indicate positive connection (this can be by either turning a segment light on; the segment light can be preferably illuminated in Blue and when a connection is lost it can either turn off or alternatively turn amber). When the MFDAU is used for wifi connection to the EFB, then the blue wifi connection LED could be on the MFDAU.

Upon the acquisition of a positive WiFi connection, the EFB preferably creates at least four (4) primary files (MFDAU, Voice, Video, and Vibration) in which to store the received data. The EFB software will preferably "listen" for auxiliary data streams (e.g., medical equipment, Wx radar data) and preferably will create a file to capture that data if the stream is present.

The EFB will preferably contain a governing application which drives the logic for WiFi connection, security, file structure, and data processing including the option to apply high level encryption to a specified data stream. The application will preferably have a set up function that will store security settings and customer driven options within non-volatile memory. Alternatively, the encryption can be done by the MFDAU or QAR, whichever connects via wifi to the EFB.

When the data stream(s) are received by the EFB, the EFB will preferably encrypt the data (if selected by the customer) prior to storing the data in the designated file. All encrypted files preferably include individual passwords associated with them to ensure that only authorized users can read that particular data.

During aircraft operation (based upon customer selections) a data stream can be preferably accessed by other applications running on the same EFB which display, analyze and interact with customer commands (e.g., FOQA, Vibration Analysis, medical charting software).

When the flight is complete and the aircraft is shut down, the EFB application preferably closes the files.

FIGS. 5-10 show additional embodiments of the present invention.

NORTH QAR-3 W Technical Specifications

The following identifies the technical functions and dimensional parameters that are desired to be achieved in the development of the NORTH-3 W Quick Access Recorder Physical characteristics;

1. The QAR-3w and MFDAU should maintain the same "footprint" of the existing QAR and MFDAU with flexibility as to the height of the enclosure,
   a. preferably e.g. 5.0" W×4.5" D×XXX" H or 7.86" W×7.09" L×XXXH as it relates to the MFDAU.
2. QAR should maintain the existing access door design with an appropriate adjustment for a change in height.
3. Operating temperature range=preferably −40 to +70 degrees C.
4. Storage temperature range=preferably −40 to +85 degrees C.
5. Relative humidity preferably 10 to 90% non-conditioned.

Memory:

1. Imbedded SSD with overwrite (loop) capability:
2. SSD & SD Card capacity to hold preferably a minimum of 2 hours, more preferably at least 4, even more preferably at least 6 hours, even more preferably a minimum of 8 hours, even more preferably a minimum of 10, even more preferably a minimum of 12, and most preferably at least 24 hours of encrypted video;
3. SSD & SD Card capacity to hold preferably a minimum of 2 hours, more preferably at least 4, even more preferably at least 6 hours, even more preferably a minimum of 8 hours, even more preferably a minimum of 10, and even more preferably a minimum of 12, and most preferably at least 24 hours of encrypted flight data:
4. SSD & SD Card capacity to hold preferably a minimum of 2 hours, more preferably at least 4, even more preferably at least 6 hours, even more preferably a minimum of 8 hours, even more preferably a minimum of 10, and even more preferably a minimum of 12, and most preferably at least 24 hours of encrypted vibration/HUMS data.

Power:
1. Normal QAR power should be supported via the existing power structure coming from the MFDAU. This power connection will be used to:
   a. Power the QAR during normal operations;
   b. Recharge to internal QAR cap or battery.
2. QAR or MFDAU back up/shutdown power should provide a minimum of for example 1 minute 30 seconds of power to the QAR or MFDAU operating system.
3. Preferred internal power source is to be by means of either:
   a. Capacitor;
   b. Lithium battery containing under 25 g of lithium.

Processing capability:
1. The QAR or MFDAU board should run on a standard Linux platform
2. QAR or MFDAU Board should be capable of processing a minimum flow needed to handle the aggregate flow from all input sources, including:
   a. 3 Mbit/s data from the MFDAU:
   b. 8 hours of recordings from the CV2R;
   c. 10 Mbit/s data from the vibration inputs;
   d. 3 Mbit's data and messages from the medical or auxiliary computer sources (up to for example at least 3 auxiliary devices).
3. QAR or MFDAU Board should be able to apply a continuous high level encryption of all data streams.
4. QAR or MFDAU Board should be capable of maintaining the sorting of individual data streams so they may be easily separated from the composite data stream.
5. QAR or MFDAU Board should have the capability to accept and execute new firmware changes received through the 802.11 wireless connection from an external device (this could include that update being received from a satellite communications (satcom) input).
6. The QAR or MFDAU Board should have the ability to sense brief wifi interruptions, identify where the break was in the consolidated data stream and be able to reestablish connectivity with the EFB and resume data transmission at the point of interruption (i.e., go back in SSD memory and retransmit data).
7. The QAR-3 W should maintain the existing shutdown logic using the button located between SD Cards. I.e., door open initiates SD Card close files shutdown process. There could be a different methodology for shutdown of wifi and EFB stream in cases where the door may be opened by mistake or even on purpose where a customer wants to retrieve the SD Card data early but valuable data is still being received via wifi from medical or other external devices that should continue to record on the EFB. Such a methodology could include logic from the internal system computing platform that will continue to direct live data inputs to the EFB until such time that total power to the system has been removed and the EFB has received instructions to perform the file closing protocols.

Wi-Fi
1. The wifi chip set should be 802.11n or better with a throughput rate of at least 22 Mbit/s.
2. The wifi capability should be capable of being upgraded to 802.11ac without a change to firmware.
3. The wifi chip should employ a WPA security routine.
4. The wifi feature should be able to connect to numerous external devices (e.g., a maximum of 5) with differing passwords.
5. The wifi feature should be capable of communicating with the QAR "Connect" blue light indicating positive connection to an approved device (EFB).

The wifi and encryption can be anywhere on aircraft. Preferably, the wifi capability and encryption can be in either the QCR (quick communications recorder) or the MFDAU.

The logic platform can reside in the MFDAU as shown in FIG. 4, or QAR as shown in FIG. 1. Encryption can take place, for example, in the MFDAU, QAR, or in EFB as shown in FIG. 2, or in a smart phone.

The present invention contemplates moving more data than just what has been heretofore stored on an SD card in a MFDAU, CV2R, and/or vibration monitoring device. The additional data can include for example, medical data, and weather data.

The following is a listing of acronyms or abbreviations and their full names or descriptions.

| Acronym or abbreviation | Full name or description |
|---|---|
| 4G | 4th Generation |
| 8× | 8 times |
| 28× | 28 times |
| 32× | 32 times |
| AC Tach Gen Inputs | An instrument that measures the rotational rate of a shaft using an internally generated electrical signal. |
| App | Software application |
| Area Mic | A microphone that captures a broad range of ambient sound |
| ED-155 | |
| ARINC | Aeronautical Radio, Incorporated |
| ARINC 429 | Aeronautical Radio, Incorporated data protocol 429. |
| ARINC 717 | Aeronautical Radio, Incorporated data protocol 717. |
| Auto pilot | a system used to control the trajectory of a vehicle without constant 'hands-on' control by a human operator being required. |
| A, V, D, R Annunciator | a panel mounted indicator that indicated the status of the "A"—audio, "V"—video, "D"—data, "R"—recording functions of the system. |
| BNC Connectors | The BNC (Bayonet Neill-Concelman) connector is a miniature quick connect/disconnect radio frequency connector used for coaxial cable. |
| C. | Celsius |
| Cat-5 | Category 5 cable (Cat 5) is a twisted pair cable for carrying signals. |
| CDMA | code divisional multiple access |
| Comm Board | A PCB (printed circuit board), with a CPU (central processing unit), short and long term memory, and expansion buses, designed to process and facilitate both wired and wireless digital communications. |
| Composite ARINC 717 | Aeronautical Radio, Incorporated Composite data protocol 717 |

-continued

| Acronym or abbreviation | Full name or description |
|---|---|
| Config. | Configuration |
| CV2R | Cockpit Voice and Video Recorder |
| ED-112 | European Organisation for Civil Aviation Equipment standard 112 |
| ED-155 | European Organisation for Civil Aviation Equipment standard 155. |
| EFB | electronic flight bag |
| FAA | Federal Aviation Administration |
| FADEC/VEMD | Full authority digital engine (or electronics) control/Vehicle & Engine Monitoring and Display |
| FDR-ARINC 717 | Flight data recorder - Aeronautical Radio, Incorporated Composite data protocol 717. |
| FOQA | Flight Operational Quality Assurance |
| g | gram |
| Garmin | Garmin brand of avionic devices. |
| G force | gravitational force |
| GPS | global position system |
| Gyros | gyroscope |
| HUMS | Health and usage monitoring systems |
| ICS | internet connection sharing |
| IEEE | Institute of Electrical and Electronics Engineers |
| Intellstart-RS-485 | Recommended Standard 485 for serial communications with automatic start. |
| IR | infra-red |
| JPEG | Joint Photographic Experts Group (a file format for photos) |
| kbps | kilobits per second |
| kHz | 1000 Hertz |
| L-Band | L band refers to four long different bands of the electromagnetic spectrum: 40 to 60 GHz (NATO), 1 to 2 GHz (IEEE), 1565 nm to 1625 nm (optical), and around 3.5 micrometers (infrared astronomy). |
| LED | light emitting diode |
| live | Real, or near real, time. |
| mbps | megabits per second |
| MFDAU | Multi Function Data Acquisition Unit |
| MPEG | Motion Picture Experts Group (a file format for videos) |
| NFDS | North Flight Data Systems, LLC |
| No. | Number |
| NORTH | See pg. 9, line 13 North Flight Data Systems, LLC |
| POE | Power Over Ethernet |
| QAR | Quick Access Recorder |
| QAR-3W | North Quick Access Recorder model 3W |
| QCR | Quick Communications Recorder |
| RJ-45 | a connector used for modem connections |
| RS-232 | Recommended Standard number 232 for serial communications. |
| RS-485 | Recommended Standard number 485 for serial communications. |
| Satcom | Satellite Communications |
| SD | Secure Digital |
| SMA | SubMiniature version A |
| SMART Config | A software app named Safety Matrix And Reporting Threshold which compares a set of customer defined parameter limits and initialtes a textural message to broadcast via a communications link to the customer. |
| SSD | Solid State Drive |
| SSID | Service Set Identifier |
| System Config | System Configuration |
| USB | Universal Serial Bus |
| Video In - BNC Connectors | The BNC (Bayonet Neill-Concelman) connector is a miniature quick connect/disconnect radio frequency connector used for coaxial cable. |
| WiFi | a local area wireless technology that allows an electronic device to exchange data or connect to the internet using 2.4 GHz UHF and 5 GHz SHF radio waves based on the Institute of Electrical and Electronics Engineers' (IEEE) 802.11 standards |
| WPA | WIFI Protected Access. |
| Wx | Weather |
| XM Weather RS-232 | Subscription, Weather Service (see RS-232 above) |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. An apparatus comprising:
a) means for receiving data;
b) means for recording data;
c) at least one aircraft sensor that senses data; and
d) a means of autonomous transmission of data to a removable device in an aircraft, wherein said removable device has software to analyze the data, break up the data, and send messages that can include broken up data to one or more different remote locations.

2. The apparatus of claim 1, wherein data analysis is conducted in real-time.

3. The apparatus of claim 1, wherein the means for receiving data includes inputs, and wherein the inputs receive data from a Cockpit Voice Recorder (CV2R) Ethernet Feed, an Ethernet Vibration Feed, and a Multi Function Data Acquisition Unit (MFDAU) Data Feed.

4. The apparatus of claim 1, wherein an alert with an exceedance message is transmitted via a cellular or satellite data conduit after the data is analyzed.

5. The apparatus of claim 1, wherein the data is encrypted before transmission to the removable device.

6. The apparatus of claim 1, wherein the removable device sends messages to one or more aircraft crew members in the aircraft to let the aircraft crew members know that there is an issue.

7. The apparatus of claim 2, wherein an alert with an exceedance message is transmitted via a cellular or satellite data conduit after the data is analyzed.

8. The apparatus of claim 1, wherein the means of transmission is wireless transmission.

9. The apparatus of claim 8, wherein the wireless transmission occurs substantially continuously while the aircraft is in flight or taxiing.

10. The apparatus of claim 8, wherein the wireless transmission occurs substantially continuously while the removable device is in the aircraft.

11. A method for acquiring data, analyzing said data, and transmitting data and/or analysis of the collected data to one or more remote locations using the apparatus of claim 1.

12. The method of claim 11, wherein the data and/or analysis is conducted in real-time.

13. The method of claim 12, wherein the data and/or analysis further comprises comparing data in a virtual live basis in flight with Flight Operational Quality Assurance (FOQA).

14. The method of claim 11 further comprising a means of encrypting the data.

15. A method of autonomously transmitting and analyzing sensor data from an aircraft, comprising:
autonomously transmitting the aircraft sensor data to a portable electronic device which an aircraft crew member brings onto the aircraft;
wherein the portable electronic device has software that analyzes the data on a live basis in flight, a means to break up the data, and sends messages that can include broken up data to one or more separate remote locations.

16. The method of claim 15, wherein the data is wirelessly transmitted to the portable electronic device in the aircraft.

17. The method of claim 15, wherein the data is transmitted and analyzed substantially continuously while the aircraft is in flight or taxiing.

18. An apparatus comprising:
   a) means for receiving data;
   b) means for recording the data;
   c) at least one aircraft sensor that senses data; and
   d) a means of autonomous transmission of the data to a removable electronic device in an aircraft, wherein said removable electronic device has a means of breaking up the data, and distributing the data.

19. The apparatus of claim 18, wherein the removable electronic device is an electronic flight bag (EFB) and has a means for analyzing data in real-time.

20. The apparatus of claim 19, wherein the means of distributing data includes sending messages to one or more different remote locations or to one or more aircraft crew members in the aircraft to let the crew members know that there is an issue with the aircraft.

\* \* \* \* \*